Feb. 9, 1926.
A. H. BRUNNER
1,572,762
GREASE DISPENSING DEVICE
Filed Oct. 17, 1924
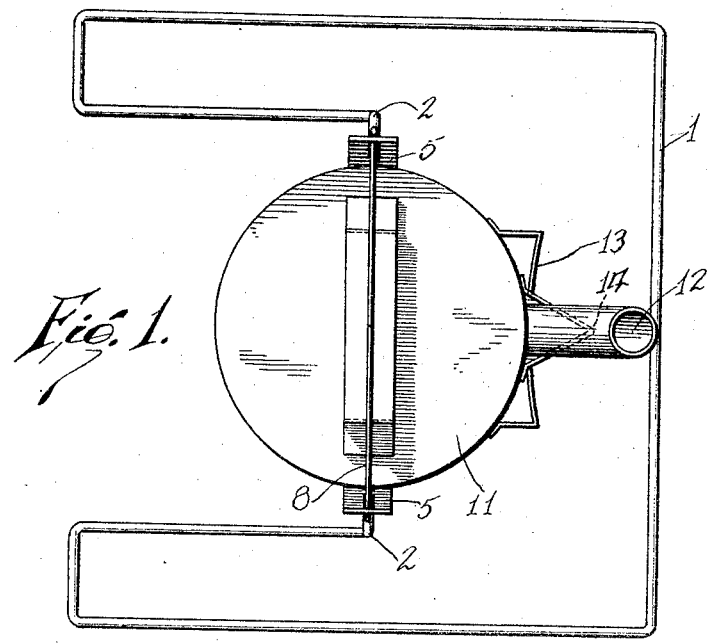
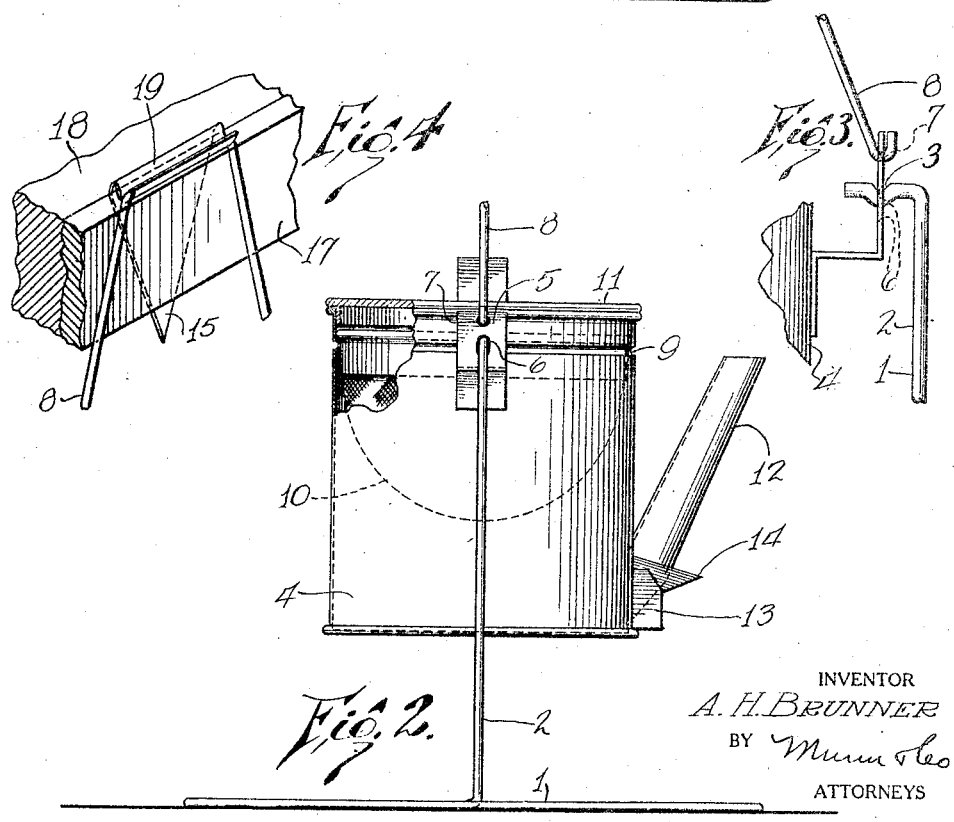
INVENTOR
A. H. BRUNNER
BY
ATTORNEYS Patented Feb. 9, 1926.

1,572,762

UNITED STATES PATENT OFFICE.

ALBERT HARRY BRUNNER, OF CARBONDALE, ILLINOIS.

GREASE-DISPENSING DEVICE.

Application filed October 17, 1924. Serial No. 744,216.

*To all whom it may concern:*

Be it known that I, ALBERT HARRY BRUNNER, a citizen of the United States, and a resident of Carbondale, Jackson County, State of Illinois, have invented a new and useful Improvement in Grease-Dispensing Devices, of which the following is a full, clear, and exact description.

My invention relates to improvements in grease dispensing device, and it consists in the combinations, constructions and arrangements herein described and claimed.

An object of my invention is to provide a grease dispensing device which is adapted to be held in close proximity to the top of the stove, and which may be tilted at will, so as to pour grease therefrom.

A further object of my invention is to provide a device of the type described in which the center of gravity is disposed in such a position to the tilting pivot, as to cause the container to right itself after it has been tilted.

A further object of my invention is to provide a device of the type described which makes use of novel means for saving all of the grease.

Other objects and advantages will appear in the following specification, and the novel features of the invention will be particularly pointed out in the appended claim.

My invention is illustrated in the accompanying drawings, forming part of this application, in which—

Figure 1 is a top plan view of the device,

Figure 2 is a side elevation of the device, portions thereof being shown in section.

Figure 3 is a fragmentary portion of a part of the device, and

Figure 4 is a perspective view showing an alternative supporting means for the grease container.

In carrying out my invention I make use of a supporting frame 1 which is shown rectangular in shape in Figure 1, and which has two upwardly extending arms 2 that are bent inwardly adjacent to their tops and provided with V-shaped portions 3. A container 4 has brackets 5 secured thereto. In Figure 2 I have shown how the brackets 5 are provided with slots 6 and openings 7. The slots 6 are adapted to receive the arms 2 while the openings 7 are adapted to receive the ends of a bail 8. The container 4 is pivotally supported by the arms 2 and may be tilted when dispensing grease therefrom.

In Figure 2 I have shown the container as being provided with an inwardly extending bead 9 which supports a strainer 10. A cover 11 closes the open end of the container and prevents dust and the like from settling upon the grease within the container. The grease is adapted to be poured from a spout 12 which communicates with the bottom of the container 4. It is obvious that after grease has been poured from the spout 12 some of the grease will run back down upon the outer surface of the spout 12 and would be lost if some means were not provided for catching this grease. To this end I provide a trough 14, (see Figures 1 and 2) that is positioned directly beneath the spout 12. The grease will flow down along the spout 12 and will be conveyed into the trough 14. When the dispensing device is again used, the grease will not only flow from the spout 12 but will also flow from the trough 14. In this way, I make use of all of the grease.

From the foregoing description of the various parts of the device, the operation thereof may be readily understood. The frame 1 is placed upon the top of a stove or other heating surface and pivotally supports the container 4. The grease may now be placed in the container 4 and will be quickly turned into a liquid state due to the heat of the stove. If the cook desires to pour grease into a frying pan or the like he merely moves the frying pan against the bottom of the container, to cause the grease to pour from the spout 12. A curved guard 13 is provided for the purpose. The pan bears against the curved guard and is prevented from slipping due to the concave curve. As soon as a sufficient quantity of grease has been poured from the spout 12, the frying pan is removed, whereupon the container 4 will instantly right itself due to the fact that the container is pivoted adjacent to the top thereof.

Some of the grease will flow down along the outside of the spout 12 after the container has righted itself, and this grease will be caught and retained in the trough 14. As shown in Figure 2, the trough 14 is disposed adjacent to the bottom of the container 4 and the grease therein will therefore be kept in a liquid state because of being in close proximity to the heat. The trough 14 acts as a spout when the container 4 is again tipped and therefore the grease is poured from the trough 14 at the same time the grease is poured from the spout 12. In this way, all of the grease is used.

In case the doughnuts or French fried potatoes have been cooked, the excess grease may be poured back into the container, where it may be used again. The strainer 10 separates all foreign matter from the grease, before the grease can again pass through the spout 12.

It is not necessary to support the container 4 by means of the frame 1. In Figure 4 I have shown a supporting member 15 for the bail 8. This member is wedge shaped. In Figure 4 I have shown the member as being disposed between the molding 17 of a shelf and the shelf 18. It is obvious that the member may be disposed in other places than that shown in Figure 4. The upper end of the member 15 is curved at 19 and this curved portion is long enough so as to readily receive the top of the bail 8. The curved portion 19 also supports the wedge in position. If desired, the member 15 may be disposed close to the stove so that the container 4 will be placed just above the surface of the stove when it is supported by the member. The advantages derived from the device are that it can be placed at a most convenient point on the range, and be readily tilted every time grease is needed. The device is sanitary, which is a distinct step forward over the old type of open vessel from which the grease had to be dipped by a spoon. With the present device, the pan may be greased far more quickly and it prevents any of the grease from dripping on the top of the stove where it would burn and cause a foul effluvium in the kitchen. The device is very simple in construction and is durable and efficient for the purpose intended.

I claim:

A device of the type described comprising a container supporting frame, a container pivotally carried by said frame, said frame holding said container in close proximity to the supporting surface, said container being adapted to swing into normal position after being tipped, this swinging being due to gravity, a spout in communication with said container, a grease catching trough disposed at the bottom of said spout and being in the same plane as the bottom of said container, said trough being adapted to catch the grease draining down the outside of the spout and being positioned adjacent to the supporting surface, whereby the heat from the supporting surface will keep the grease within the trough in a liquid state, and permit the grease to be poured from said trough the next time the container is tilted.

ALBERT HARRY BRUNNER.